(12) United States Patent
Jin

(10) Patent No.: US 10,769,753 B2
(45) Date of Patent: Sep. 8, 2020

(54) GRAPHICS PROCESSOR THAT PERFORMS WARPING, RENDERING SYSTEM HAVING THE GRAPHICS PROCESSOR, AND METHOD OF OPERATING THE GRAPHICS PROCESSOR

(71) Applicant: SAMSUNG ELECTRONICS CO., LTD., Suwon-si (KR)

(72) Inventor: Seung-hun Jin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/028,535

(22) Filed: Jul. 6, 2018

(65) Prior Publication Data
US 2019/0197663 A1     Jun. 27, 2019

(30) Foreign Application Priority Data
Dec. 22, 2017 (KR) .................. 10-2017-0178741

(51) Int. Cl.
*G09G 5/00* (2006.01)
*G06T 3/00* (2006.01)
*G06T 1/20* (2006.01)

(52) U.S. Cl.
CPC .............. *G06T 3/0093* (2013.01); *G06T 1/20* (2013.01)

(58) Field of Classification Search
CPC ... G06T 2210/44; G06T 3/0093; G06T 13/00; G06T 13/80; G06T 13/20
USPC ....................................................... 345/646
See application file for complete search history.

(56) References Cited

U.S. PATENT DOCUMENTS

| 6,449,674 | B1* | 9/2002 | Yun ..................... G11C 7/1072 |
| | | | 365/230.08 |
| 9,348,410 | B2 | 5/2016 | LaValle et al. |
| 9,672,586 | B2 | 6/2017 | Sundareson et al. |
| 9,681,096 | B1 | 6/2017 | Motta et al. |
| 9,736,467 | B2 | 8/2017 | Hoffman et al. |
| 2015/0370322 | A1 | 12/2015 | Gustafson |
| 2016/0026253 | A1 | 1/2016 | Bradski et al. |
| 2016/0094837 | A1 | 3/2016 | Nadler |
| 2016/0142697 | A1 | 5/2016 | Budagavi et al. |
| 2017/0155885 | A1 | 6/2017 | Selstad et al. |
| 2017/0214820 | A1 | 7/2017 | Davis et al. |
| 2017/0228855 | A1 | 8/2017 | Bates et al. |
| 2018/0146189 | A1 | 5/2018 | Park |

(Continued)

FOREIGN PATENT DOCUMENTS

| KR | 10-1514653 B1 | 4/2015 |
| KR | 10-2016-0139461 A | 12/2016 |

*Primary Examiner* — Gordon G Liu
(74) *Attorney, Agent, or Firm* — Sughrue Mion, PLLC

(57) ABSTRACT

Provided are a graphics processor that performs warping, a rendering system including the graphics process, and a method of operating the graphics processor. The graphics processor may include an internal command generator and a graphics computing device. The internal command generator may be configured to receive timing information and generate, based on the timing information, a warping command for periodically performing warping. The graphic computing device may be configured to, in response to the warping command, periodically perform the warping, without a context switch by a host, by using sensing information provided from an external source and frame data that have already been rendered.

20 Claims, 15 Drawing Sheets

(56) References Cited

U.S. PATENT DOCUMENTS

2018/0165878 A1* 6/2018 Khan .................... G06F 3/0346
2019/0102859 A1* 4/2019 Hux ......................... G06T 1/20

* cited by examiner

GRAPHICS PROCESSOR THAT PERFORMS WARPING, RENDERING SYSTEM HAVING THE GRAPHICS PROCESSOR, AND METHOD OF OPERATING THE GRAPHICS PROCESSOR

CROSS-REFERENCE TO RELATED PATENT APPLICATION

This application claims priority from Korean Patent Application No. 10-2017-0178741, filed on Dec. 22, 2017, in the Korean Intellectual Property Office, the disclosure of which is incorporated herein in its entirety by reference.

BACKGROUND

Apparatuses and methods consistent with example embodiments relate to a graphics processor, and more particularly, to a graphics processor that performs warping, a rendering system including the graphics processor, and a method of operating the graphics processor.

Virtual reality (VR) refers to a user-to-device interface that creates a certain environment or situation by using a computer so that a user using the interface feels like they are interacting with a real environment and a real situation. In VR applications, a motion of a user is reflected in the image displayed to the user and thus greatly affects a sense of reality.

To quickly reflect the motion of a user to the image displayed to the user, a warping technique using a result of existing rendering may be applicable. However, a delay time occurring while a context for rendering and a context for warping are being switched therebetween may detract from the sense of reality in VR.

SUMMARY

One or more example embodiments provide a graphics processor capable of enhancing a sense of reality in virtual reality (VR) by reducing a delay time occurring during warping, a rendering system including the graphics processor, and a method of operating the graphics processor.

According to an aspect of an example embodiment, there is provided a graphics processor including an internal command generator configured to receive timing information, and generate, based on the timing information, a warping command for periodically performing warping; and a graphics computing device configured to, in response to the warping command, periodically perform the warping, without a context switch by a host, by using sensing information provided from an external source and rendered frame data that have already been rendered.

According to an aspect of an example embodiment, there is provided a rendering system including a timer configured to generate cycle information representing a warping timing; a graphics processor configured to perform rendering in response to a command from a host to generate rendered frame data; a memory including a memory region that stores the rendered frame data; and a processor configured to perform warping by using the rendered frame data and sensing information provided from an external source in response to timing information and store a warped image in the memory region.

According to an aspect of an example embodiment, there is provided a method of operating a graphics processor. The method may include generating rendered frame data in response to a command from a host; determining a warping timing, based on timing information received independent of the host; performing warping, based on the rendered frame data and sensing information received independent of the host; and notifying the host that the warping has been completed.

BRIEF DESCRIPTION OF THE DRAWINGS

The above and/or other aspects will become more clearly understood from the following detailed description of example embodiments, taken in conjunction with the accompanying drawings in which.

DETAILED DESCRIPTION

Example embodiments will now be described more fully with reference to the accompanying drawings.

Figure 1:
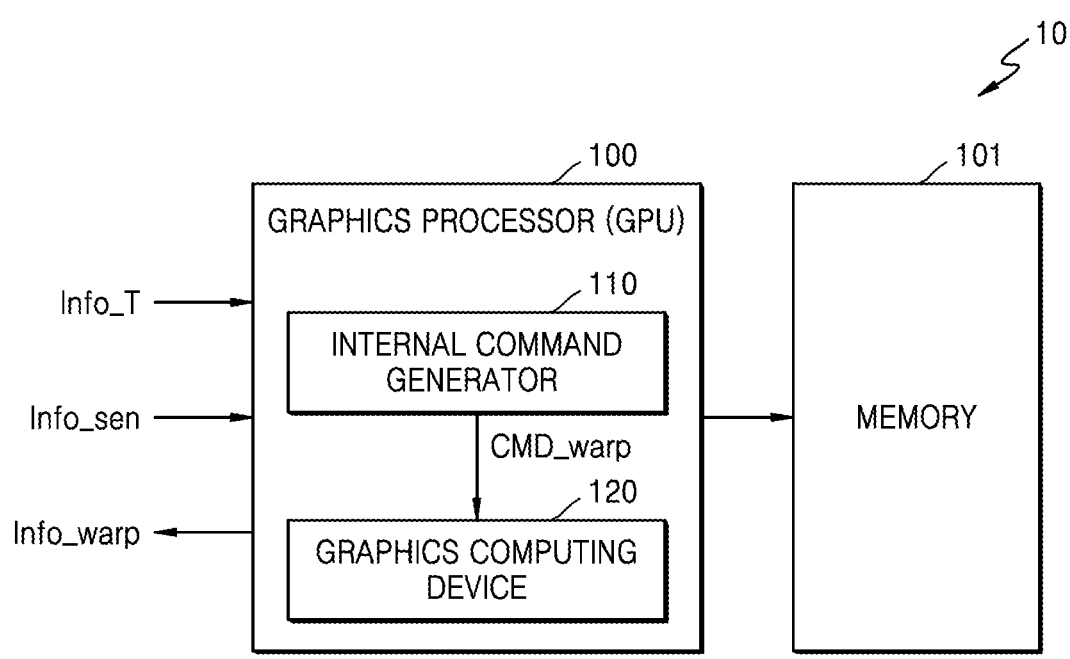
FIG. 1 is a block diagram of a rendering system according to an example embodiment.

FIG. 1 is a block diagram of a rendering system 10 according to an example embodiment. The rendering system 10 may include a graphics processor 100 and a memory 101. The graphics processor 100 may be a graphics processing unit (GPU). For convenience of explanation, in example embodiments below, a GPU may be referred to as a graphics processor. However, a graphics processor 100 may be implemented using any of various other types of processors including a central processing unit (CPU), an application processor (AP), etc.

The graphics processor 100 may perform graphics operations within the rendering system 10. For example, the graphics processor 100 may receive a three-dimensional (3D) object and perform a graphics operation on the received 3D object to thereby output a two-dimensional (2D) rendered image. The graphics processor 100 may be configured to perform tile-based rendering and may include graphics pipelines in order to achieve the configuration. The graphics pipelines may parallel-process pieces of graphics data. Each graphics pipeline may include various types of configurations for a graphics-related operation, and, for example, may be configured by hardware, software, or a combination of both.

The rendering system 10 may further include a central processing unit (CPU) that controls overall operations of the system, and various types of buses, such as a peripheral component interconnect (PCI) bus and a PCI Express bus, for communication between components. Examples of the rendering system 10 may include, but are not limited to, a personal computer (PC), a mobile phone, a smartphone, a laptop computer, a tablet PC, a personal digital assistant (PDA), a portable multimedia player (PMP), a navigation device, a smart television, a head-mounted display (HMD), and a wearable device. The rendering system 10 may correspond to any of various types of electronic systems.

The graphics processor 100 may receive pieces of rendering-related information based on various types of application program interface (API) standards, such as an Open Graphics Library (OpenGL), DirectX, and a Compute Unified Device Architecture (CUDA), and may perform various graphics-related operations, such as shading, texturing, warping, etc. The memory 101 may be integrated into the same semiconductor chip as the graphics processor 100 or implemented using a different semiconductor chip from the graphics processor 100. The memory 101 may correspond to random access memory (RAM), such as dynamic random access memory (DRAM) or static random access memory (SRAM), or may correspond to a memory device, such as read-only memory (ROM), electrically erasable programmable read-only memory (EEPROM), or flash memory. The memory 101 may store graphics data (e.g., frame data) that is to be processed by the graphics processor 100, or store graphics data processed by the graphics processor 100.

According to an example embodiment, the graphics processor 100 may perform a graphic operation for application of virtual reality (VR), and may reflect a motion of a user in an image displayed to the user in application of VR. In this case, a delay time between the motion of the user and the display screen of the VR device reflecting that user motion may be defined as a Motion-To-Photon latency, and the graphics processor 100 may perform a warping process of re-reflecting user motion information in rendered graphics data (e.g., frame data) in order to reduce the Motion-To-Photon delay time.

The graphics processor 100 may perform warping (or a thread for warping) via fixed updating in order to reduce a Motion-To-Photon delay time caused by various factors, such as context switching by a host (or by an operating system (OS)) within the rendering system 10. For example, the graphics processor 100 may not change a rendering operation to an operation for warping via a context switch by the host or the OS but may perform warping via fixed updating corresponding to a certain cycle.

According to an example embodiment, the graphics processor 100 may generate a warping command CMD_warp, based on timing information Info_T representing the certain cycle. The graphics processor 100 may periodically generate the warping command CMD_warp, based on the timing information Info_T, which is provided from a timer that may be included inside or outside the graphics processor 100. In other words, because the graphics processor 100 is able to perform warping without needing a context switch by a host for a thread change of the graphics processor 100, the Motion-To-Photon delay time may be reduced.

For such an operation, the graphics processor 100 may include an internal command generator 110 and a graphics computing device 120. The internal command generator 110 may generate an internal command for controlling a graphics operation that is performed within the graphics processor 100. For example, the internal command generator 110 may generate the above-described warping command CMD_warp in response to the timing information Info_T. The internal command generator 110 may process a command provided by the host, and may further generate another internal command for controlling an internal operation of the graphics processor 100.

The graphics computing device 120 may perform various types of graphics operations. For example, the graphics computing device 120 may perform warping by using rendered frame data and sensing information (i.e., sensor information) Info_sen in response to the warping command CMD_warp. For example, the graphics computing device 120 may determine a state in which an image displayed to the user has changed, based on the sensing information Info_sen, and may generate warping frame data (e.g., a warping image) reflected in the image displayed to the user by warping frame data. According to an example embodiment, the graphics computing device 120 may provide the host with information Info_warp indicating that warping has been completed. In other words, the graphics computing device 120 may notify the host that the warping has been completed.

The graphics computing device 120 may perform a graphics operation for general rendering in response to a command from the host. The host may provide the graphics processor 100 with a series of commands that describe a rendering technique together with data that is to be rendered, via a host driver, and the graphics processor 100 may receive and interpret a command and thus perform a rendering process including a geometric transformation process, a rasterizing process, and/or a pixel shading process.

The graphics computing device 120 may include at least one piece of hardware (e.g., a processing core), and the warping process may be performed by the at least one piece of hardware. According to an example embodiment, warping and general rendering may be performed by the same hardware or by different pieces of hardware. According to an example embodiment, while the graphics computing device 120 is performing general rendering according to a command received from the host, the graphic computing device 120 may interrupt the general rendering in response to the warping command CMD_warp from the internal command generator 110 and may perform warping.

The timing information Info_T may include information having a certain period and then may be provided to the graphics processor 100. For example, the timing information Info_T may include information that is activated at intervals of at least one frame section. The graphics processor 100 may perform a warping process using the sensing information Info_sen, at a timing when the timing information Info_T has been activated. The sensing information Info_sen may have various types of information, for example, information about a sensed head motion or head position of the user. The graphics processor 100 may communicate with the memory 101 to thereby receive the rendered frame data from the memory 101. For example, a frame that is warped may correspond to a frame immediately preceding a frame currently being rendered or the latest frame that was output (or displayed). Because warping is periodically performed according to an example embodiment, frame data warped at a certain period (e.g., regular time intervals) may be updated to the memory 101.

According to an example embodiment, because the graphics processor 100 periodically performs warping according to the timing information Info_T without needing to perform a context switch by the host that causes a time delay, the delay time may be removed during warping. In other words, according to an example embodiment, the issues of delayed warping, incomplete warping at a time when the warped image is to be output may be alleviated or eliminated, and the result of a warping process using the latest output frame may be output correctly.

Figure 2:
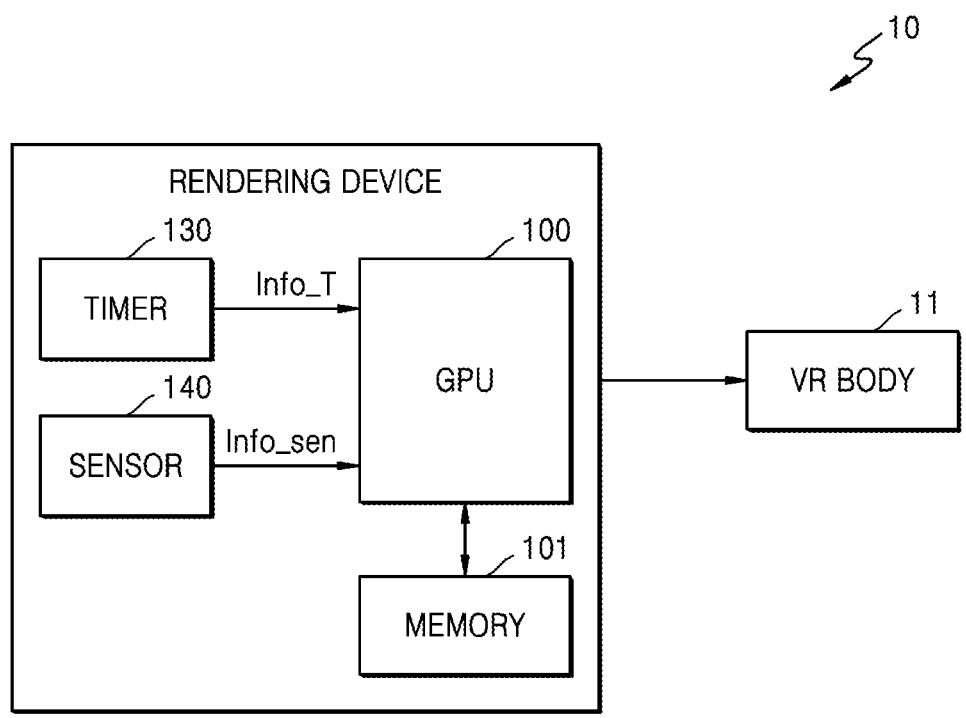
FIG. 2 is a block diagram of an example in which the rendering system of FIG. 1 has been applied to a head mounted display (HMD)

FIG. 2 is a block diagram of an example in which the rendering system 10 of FIG. 1 has been applied to an HMD. When the rendering system 10 corresponds to an HMD, the rendering system 10 may further include a VR body 11. The rendering system 10 may include the components shown in FIG. 1. The components shown in FIG. 1 may constitute a rendering device. Referring to FIG. 2, the rendering device may include the graphics processor 100 and the memory 101, and may be coupled to the VR body 11. The user may view a VR image processed by the rendering system 10 by wearing the VR body 11.

According to an example embodiment, the rendering system 10 may further include a timer 130 and a sensor 140. The timer 130 may generate timing information Info_T indicating the timing when the above-described warping process is to be performed, and may provide the timing information Info_T to the graphics processor 100. The sensor 140 may generate various types of sensing information including a head motion and a head position of a user. For example, the sensor 140 may include, but is not limited to, various types of sensors, such as an inertial sensor, an optical sensor, a proximity sensor, a magnetic sensor, an acceleration sensor, an infrared sensor, a gyroscope sensor, a location sensor (e.g., a global positioning system (GPS) sensor), a proximity sensor, and an RGB sensor (i.e., an illuminance sensor). Alternatively, the sensor 140 may correspond to other types of sensors or may further include other sensors. Although the sensor 140 is included in the rendering device in FIG. 2, the sensor 140 may be included in the VR body 11 and may provide sensing information Info_sen to the graphics processor 100 through wired or wireless communication.

Figure 3:
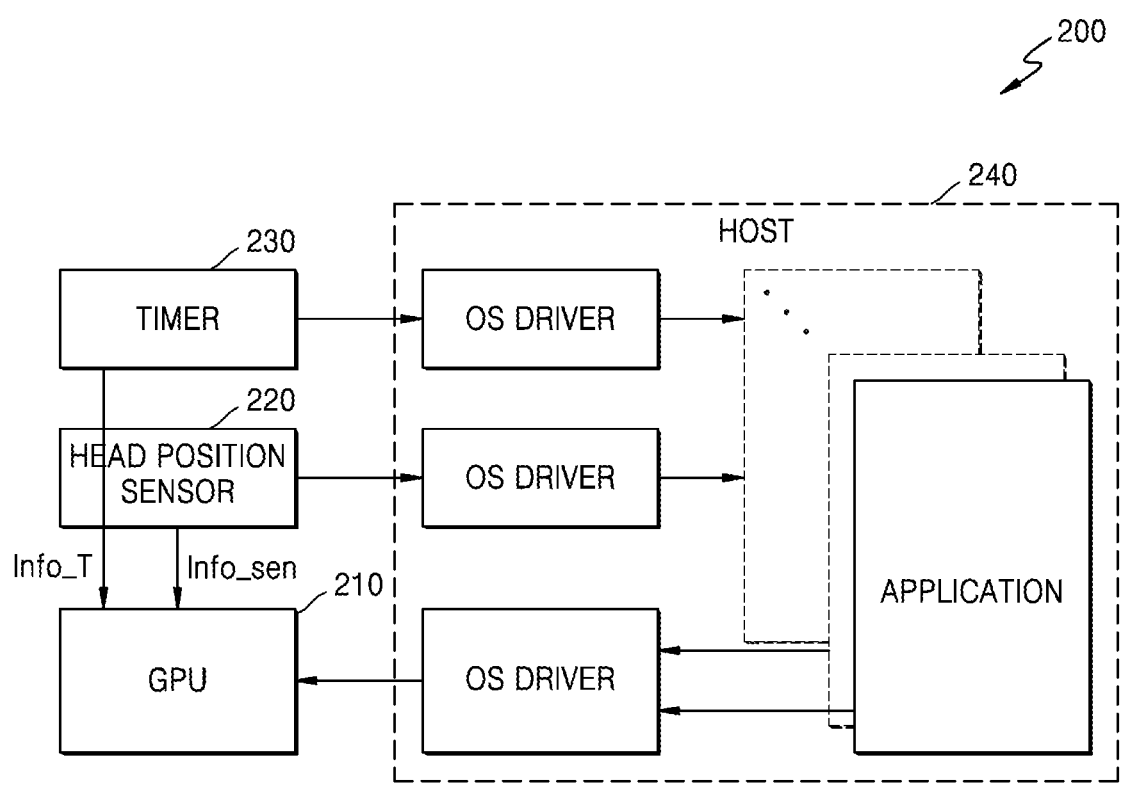
FIG. 3 is a block diagram illustrating an operation of a rendering system according to an example embodiment.

FIG. 3 is a block diagram illustrating an operation of a rendering system 200 according to an example embodiment.

Referring to FIG. 3, the rendering system 200 may include a GPU 210 as a graphics processor, a head position sensor 220 as an example of a sensor, a timer 230, and a host 240. The host 240 may include applications and host drivers. For example, the applications and the host drivers may correspond to software stored in an operation memory (e.g., main memory) included in the rendering system 200, and, as the applications and the host drivers are executed by a CPU included in the rendering system 200, functions corresponding to the applications and the host drivers may be implemented. The host drivers may be arranged in correspondence with the various types of components included in the rendering system 200, and the components included in the rendering system 200 may be controlled by the host drivers.

The host 240 may provide data to be rendered and a command to the GPU 210 via a host driver. The GPU 210 may perform rendering in response to a command via a host driver and may store a result of the rendering in an external memory.

The GPU 210 may directly receive timing information Info_T and sensing information Info_sen without requiring interventions from the host drivers, and may determine a warping timing, based on the received timing information Info_T and the received sensing information Info_sen. The timing information Info_T may include cycle information for updating the warping frame data, and the GPU 210 may perform warping according to the timing information Info_T. In other words, the GPU 210 may perform warping regardless of a context switch by an OS (or the host 240) and may provide the host 240 with information indicating that warping has been completed. The GPU 210 may temporarily interrupt the rendering process that is currently being performed in order to perform warping. For example, the GPU 210 may interrupt a process of a particular operation according to a preemption method and may perform warping. The GPU 210 may be assigned with some other resources (e.g., a processing core) and perform the warping. According to an example embodiment, warping may be performed by a resource that performs general rendering.

According to an example embodiment, within the rendering system 200, the timing information Info_T and the sensing information Info_sen may be provided to the host 240. For example, the timing information Info_T and the sensing information Info_sen may be provided to the host 240 via OS drivers, and the host 240 may control outputting of a warped image, based on various types of received information.

According to an example embodiment, the GPU 210 may include a plurality of processing cores, wherein some of the processing cores may perform rendering and the others may perform warping in parallel with the rendering. According to an example embodiment, the GPU 210 may check the sensing information Info_sen during warping based on the timing information Info_T, and may skip warping when there are no changes in the head position of the user.

According to an example embodiment, a plurality of context switches may occur based on the control of an OS when a certain application is executed, but the GPU 210 may perform warping without a context switch by an OS. Thus, a motion of a user may be quickly reflected in the display image presented to the user, leading to an improvement in the sense of reality and immersion in VR. In addition, the issue of incomplete and/or delayed rendering of a new frame at a determined frame timing due to the context switch by the OS may be alleviated or eliminated.

Figure 4:
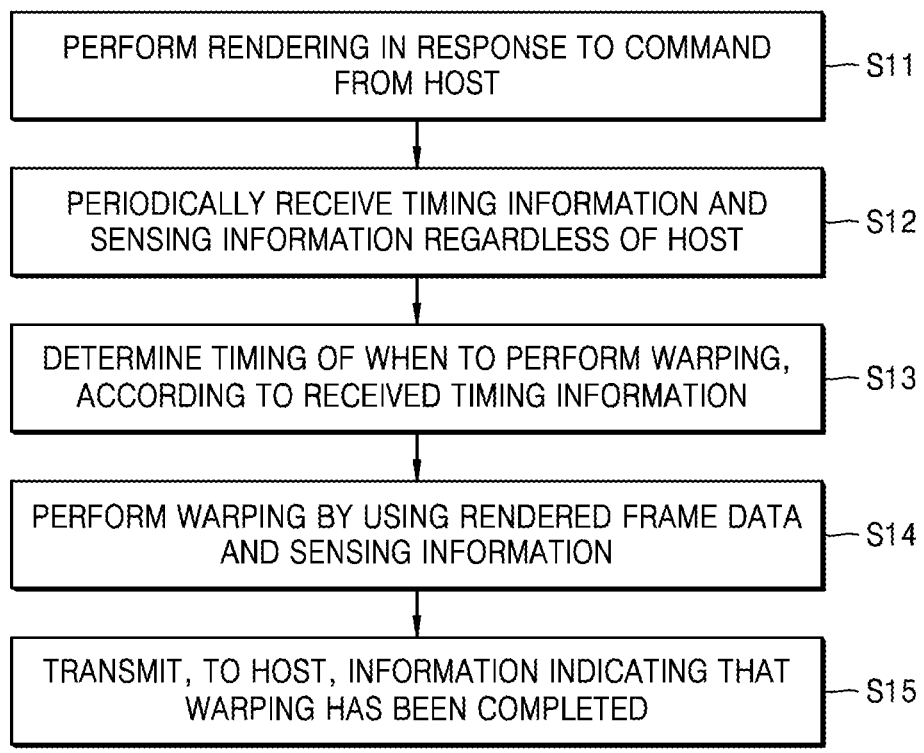
FIG. 4 is a flowchart of a method of operating a graphics processor, according to an example embodiment.

FIG. 4 is a flowchart of a method of operating a graphics processor, according to an example embodiment.

Referring to FIG. 4, the graphics processor may perform general rendering in response to a command from a host, in operation S11, and may periodically receive timing information and sensing information regardless of the host while performing rendering, in operation S12. For example, the sensing information may be periodically updated to an internal register of the graphics processor or an external memory of the graphics processor, and may be read from the internal register or the external memory and provided to a command processor included in the graphics processor.

In operation S13, the graphics processor may determine a timing of when to perform warping, according to the received timing information. In operation S14, the graphics processor may perform warping by using rendered frame data (or latest output frame data) and the sensing information. According to an example embodiment, the rendering process that is currently being performed may be interrupted and the warping may be performed, and the warping may be performed by hardware that performs rendering or by separate hardware. In operation S15, the graphics processor may transmit, to the host, information indicating that warping has been completed.

Figure 5A:
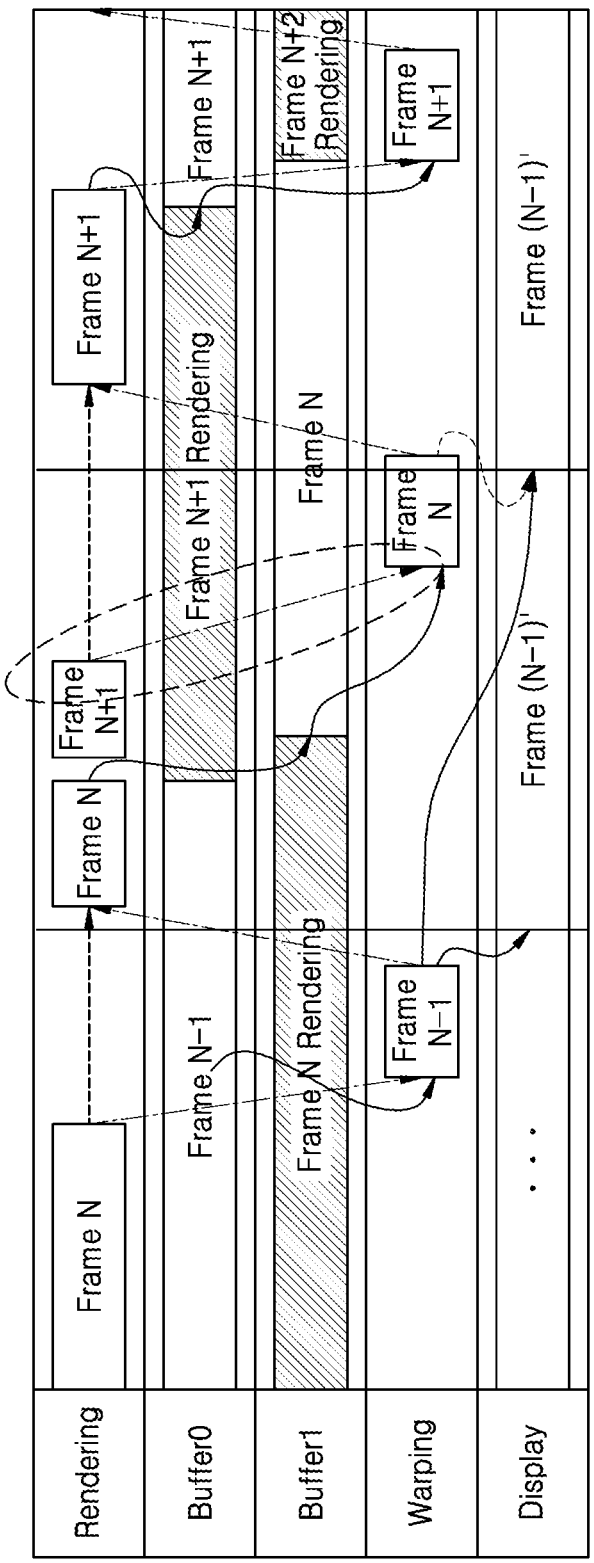
FIGS. 5A and 5B are diagrams illustrating a general warping process based on a context switch and a warping process according to an example embodiment.
Figure 5B:
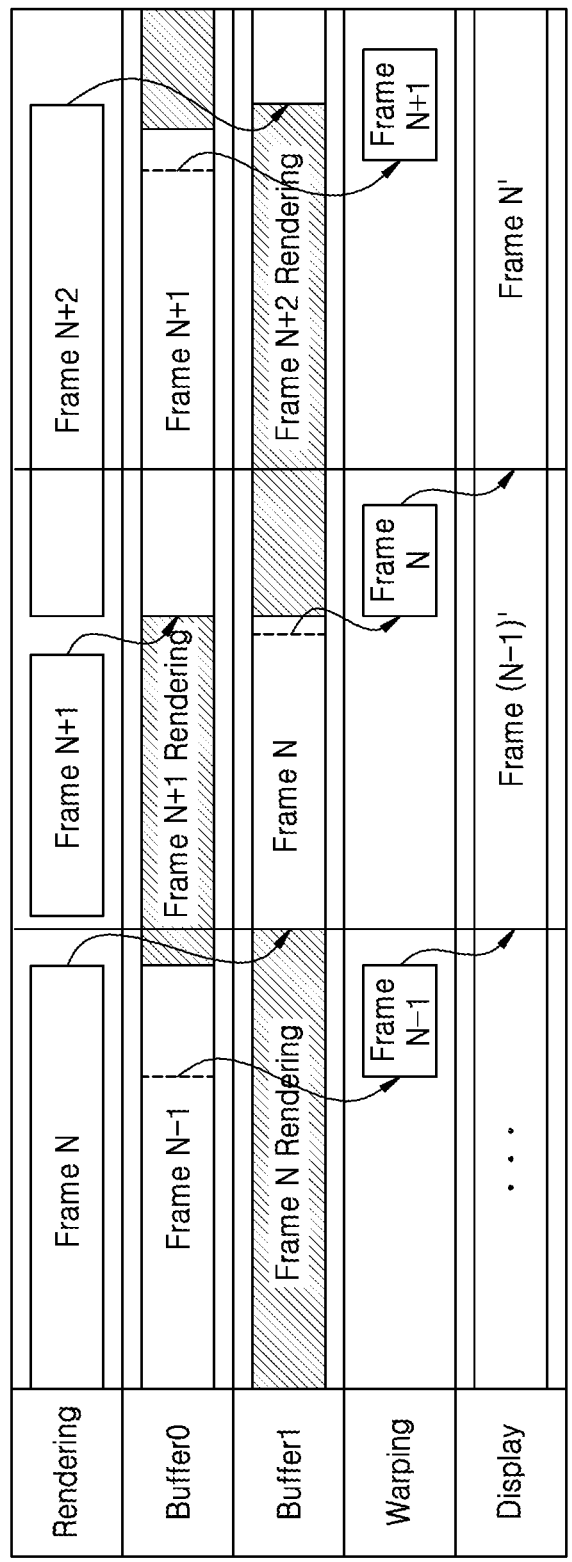

FIGS. 5A and 5B are diagrams illustrating a general warping process based on a context switch and a warping process according to an example embodiment. In the example embodiments, warping may be defined as a concept distinguished from the above-described general rendering, and rendering and the general rendering may be interchangeably used. An example of performing rendering from the viewpoint of a host will be described with reference to FIGS. 5A and 5B.

A memory may include a plurality of buffers, and first and second buffers Buffer0 and Buffer1 of FIGS. 5A and 5B are spaces for storing rendering results and thus may represent a front buffer that is used in display and a back buffer in which intermediate data of rendering is recorded. However, this is merely an example, and thus the memory may have three or more buffers.

Referring to FIG. 5A, the host may provide a command for rendering to a GPU, and the GPU may render an N-th frame by using the second buffer Buffer1. An OS event representing a warping cycle may occur during rendering, and the host may interrupt the rendering process that is currently being performed, and may request a switch to a context for warping, based on rendered frame data and head position information, via a host driver. At this time, because rendering with respect to the N-th frame has not yet been completed, the GPU may perform warping by using (N−1)-th frame data Frame N−1 rendered just before the N-th frame and stored in the first buffer Buffer0, under the control of the host, and may generate warped frame data (e.g., a warped image Frame (N−1)'). The generated warped image Frame (N−1)' may correspond to a new image obtained by reflecting recently-updated head position information of a user in the (N−1)-th frame, and the generated warped image Frame (N−1)' may be output.

After the warping, a context is switched again for rendering with respect to the N-th frame, and then rendering is performed on the N-th frame. This operation may be repeatedly performed on an (N+1)-th frame, an (N+2)-th frame, and so on.

In this case, as shown in FIG. 5A, frame omission may occur due to a delay time generated by a context switch. For example, during rendering with respect to the (N+1)-th frame after rendering with respect to the N-th frame has been completed, a delay time may unexpectedly increase in a situation where a context switch for warping has occurred as indicated by a dashed line, and a warped image using the finally output frame (e.g., the N-th frame) may not be output. In this case, an existing warped image Frame (N−1)' may be re-used under the control of the host. This may result in the reduced sense of reality and immersion in user experience.

Referring to FIG. 5B, the GPU may reduce interventions of an OS when performing warping, and thus a rendered and updated frame may be appropriately reflected during warping. For example, as shown in FIG. 5B, the GPU performs warping at regular intervals without intervention of an OS, and thus a delay time for a context switch by the OS may be removed.

For example, the GPU may perform general rendering on the N-th frame by using the second buffer Buffer1 according to a command of the host, and the GPU may perform warping by using (N−1)-th frame data stored in the first buffer Buffer0 and sensing information according to timing information and may output the warped image Frame (N−1)' generated via the warping. At this time, the host may continuously provide the GPU with commands and data for the general rendering without a context switch.

Thereafter, the GPU may perform rendering on the (N+1)-th frame according to a command of the host, and the GPU may perform warping by using N-th frame data stored in the second buffer Buffer1 and sensing information according to the timing information and may output a warped image Frame N' generated via the warping. In other words, because a delay time due to a context switch by the host generated until warping is performed may be removed, a warping result may be appropriately updated, and accordingly, a more stable and consistent user experience may be provided.

Figure 6:
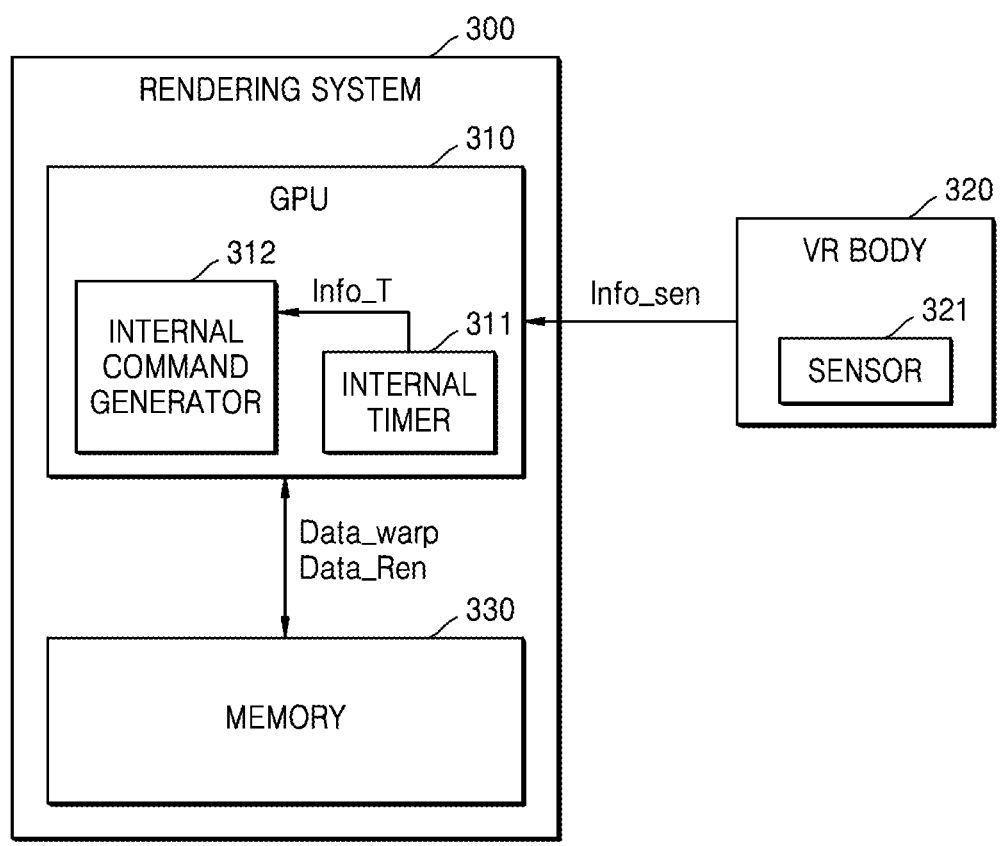
FIG. 6 is a block diagram of a rendering system according to an example embodiment.

FIG. 6 is a block diagram of a rendering system 300 according to an example embodiment.

The rendering system 300 may include a GPU 310 as a graphics processor, a VR body 320, and a memory 330. As described above, when the rendering system 300 is an HMD, components except for the VR body 320 may constitute a rendering device, and the rendering device may be coupled to the VR body 320.

The GPU 310 may include an internal timer 311 and an internal command generator 312, and the VR body 320 may include a sensor 321. The memory 330 may include at least one buffer in the above-described example embodiment, and the GPU 310 may receive rendered frame data Data_Ren from the memory 330, may perform the warping according to the above-described example embodiment with respect to the rendered frame data Data_Ren, and may store warped frame data Data_warp in the memory 330.

According to an example embodiment, the timing information Info_T and the sensing information Info_sen may be generated in various forms within the rendering system 300. In FIG. 6, because the VR body 320 includes the sensor 321, the VR body 320 may sense a head motion and a head position of a user and may provide the sensing information Info_sen to the GPU 310 via a wired or wireless transmission unit. The GPU 310 may periodically perform warping without interventions of a host or an OS according to the timing information Info_T from the internal timer 311 of the GPU 310. The feature shown in FIG. 6 is merely an example embodiment, and thus the internal timer 311 and the sensor 321 may be arranged in various other locations within the rendering system 300.

Figure 7:
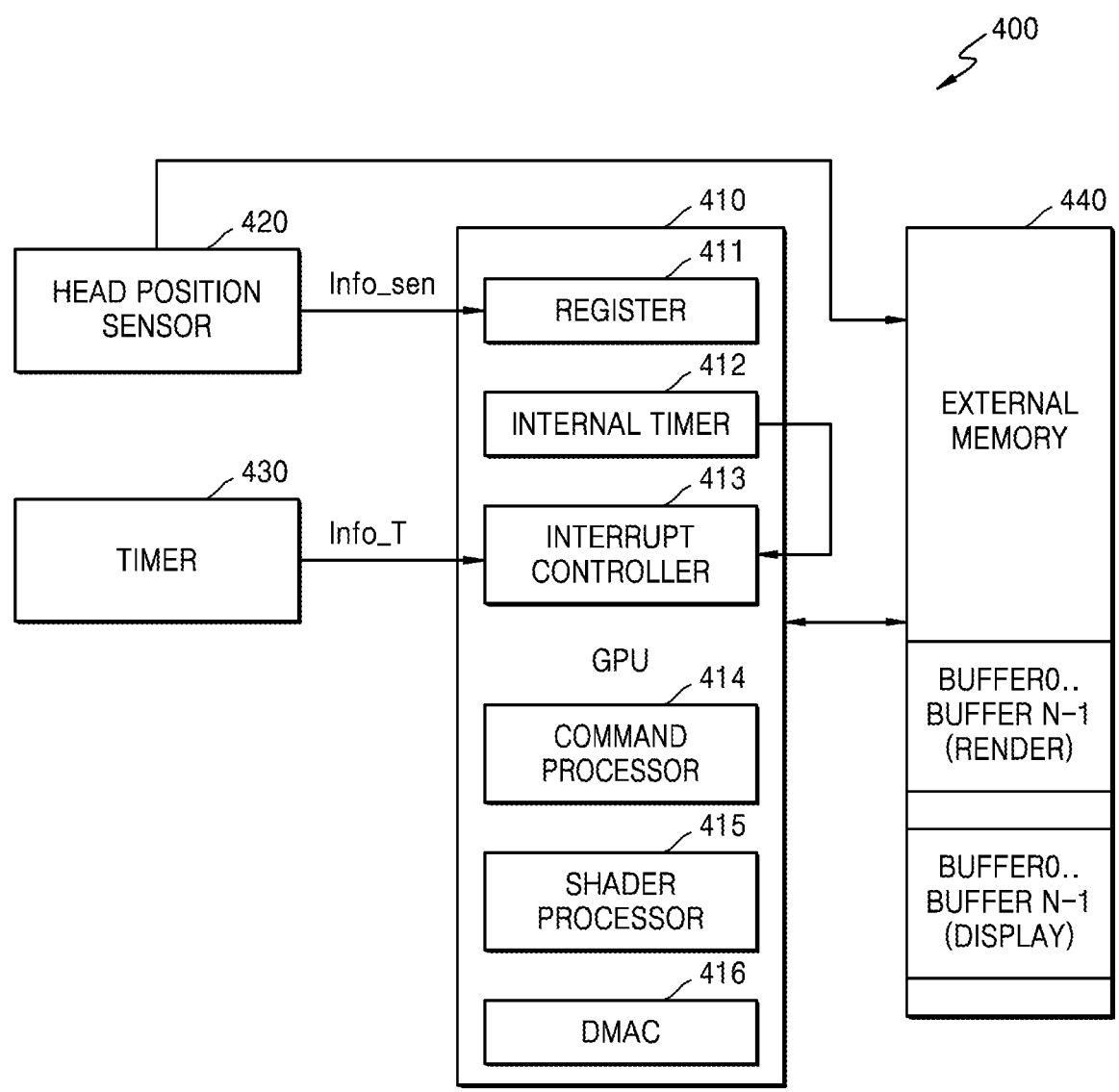
FIG. 7 is a block diagram illustrating a detailed structure and an operation of a graphics processor according to an example embodiment.

FIG. 7 is a block diagram illustrating a detailed structure and an operation of a graphics processor according to an example embodiment.

Referring to FIG. 7, a rendering system 400 may include a GPU 410 as a graphics processor, and may further include a sensor 420, a timer 430, and a memory 440. FIG. 7 illustrates, as the sensor 420, a head position sensor that senses a head motion and/or a head position of a user. The sensor 420 and the timer 430 may be arranged in various locations within the rendering system 400, or, according to the above-described example embodiment, the sensor 420 may be arranged in a VR body.

The GPU 410 may include a register 411, an interrupt controller 413, a command processor 414, a shader processor 415, and a memory controller 416. The GPU 410 may include, as an optional component, a component that internally detects a timing. FIG. 7 illustrates an example in which an internal timer 412 is included in the GPU 410. In this case, the timer 430 may not be included in the rendering system 400, or the GPU 410 does not need to receive the timing information Info_T from the timer 430. For example, the memory controller 416 may be a direct memory access controller (DMAC).

The memory 440 may include various storage regions, for example, a region that stores various pieces of information used in the rendering system 400, and at least one buffer region that stores frame data rendered according to the above-described example embodiment and frame data that is being rendered. Warped frame data may be further stored in the memory 440, and a host may output a warped image stored in the memory 440 to a display.

The register 411 may temporarily store various pieces of information associated with a graphics operation. For example, the register 411 may store state information associated with an operation of the GPU 410 or store the sensing information Info_sen, such as head motion and/or head position information received from the sensor 420. When warping is performed within the GPU 410, the sensing information Info_sen periodically updated in the register 411 may be used.

Alternatively, as an example, the sensing information Info_sen from the sensor 420 may be stored in a region of the memory 440, and address information of the region of the memory 440 where the sensing information Info_sen is stored via an initial setting process of the rendering system 400 may be stored in the register 411. When warping is performed within the GPU 410, the sensing information Info_sen read from the memory 440 according to the address stored in the register 411 may be used.

The interrupt controller 413 may control an interrupt operation in response to timing information Info_T inside or outside the GPU 410. According to an example embodiment, the interrupt controller 413 may control interruption such that the GPU 410 performs warping, based on the timing information Info_T. For example, the interrupt controller 413 may interrupt the rendering process that is currently being performed and control the interruption such that warping is performed. The command processor 414 may perform the internal command generation operations according to the above-described example embodiments, and may generate a warping command for controlling warping according to an example embodiment. The command processor 414 may perform an overall command control operation within the GPU 410, and may perform an operation of processing a command received from the host.

The shader processor 415 may be a component included in the graphics computing device according to the above-described example embodiment, and may include at least one piece of hardware that performs a graphics operation including warping. For example, the shader processor 415 may perform a graphics operation based on shading during general rendering, and may perform warping under the control of the command processor 414 according to the above-described example embodiment. As described above, the rendering and the warping may be performed by the same hardware or by different pieces of hardware.

The memory controller 416 may perform a control function for directly accessing the memory 440 outside the GPU 410. The shader processor 415 may perform warping by using the frame data received via the memory controller 416, and may provide frame data corresponding to a result of the warping to the memory 440 via the memory controller 416.

Figure 8:
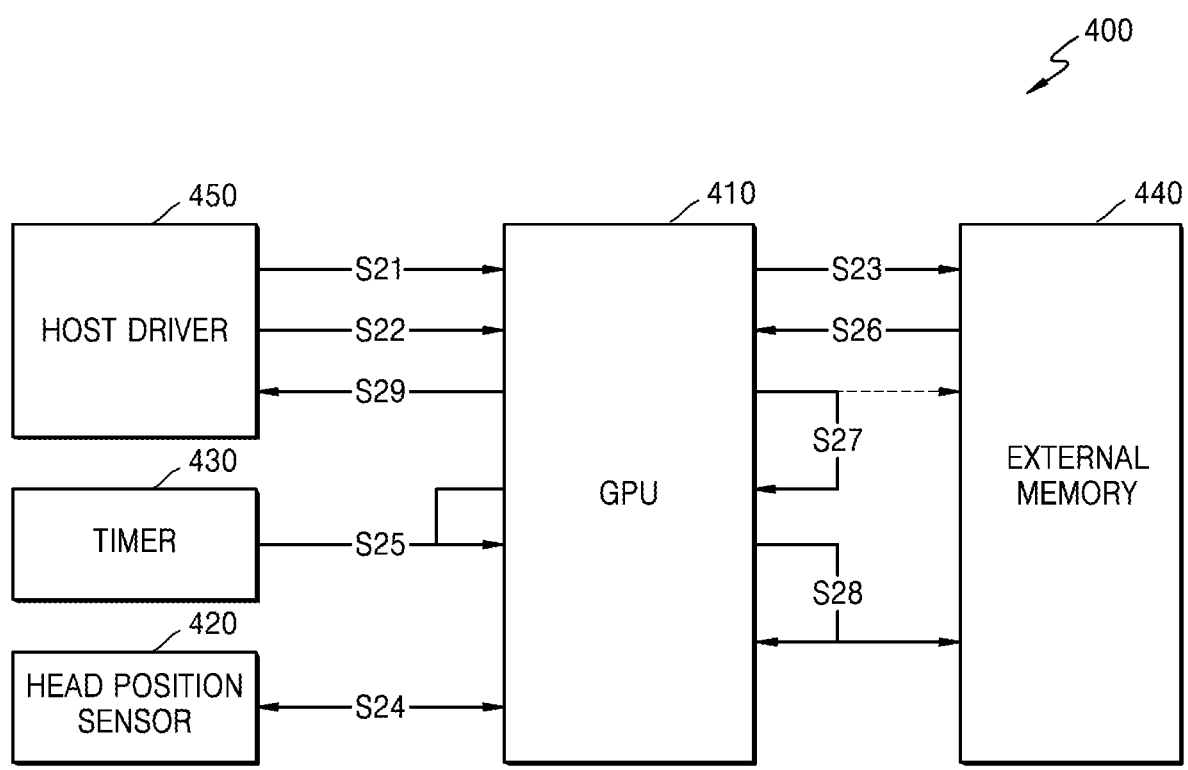
FIG. 8 is a block diagram illustrating a flow associated with an operation of a graphics processing unit (GPU)

An operation of the GPU 410 will now be described with reference to FIGS. 7 and 8. FIG. 8 is a block diagram illustrating a flow associated with an operation of the GPU 410. FIG. 8 further illustrates a host driver 450 included in the rendering system 400 to control the GPU 410.

In operation S21, the host may transmit a shader for warping to the GPU 410 via the host driver 450. The shader for warping may include information, such as instructions and programs associated with a warping operation that is to be performed by the shader processor 415, and may be set within the GPU 410 when the rendering system 400 operates. For example, warping may be performed by various types of operations, and an instruction that describes a warping operation method may be transmitted to the GPU 410. The GPU 410 may perform warping without subsequent interventions of the host, based on the set information. According to an example embodiment, the shader for warping may be stored in the memory 440, and the GPU 410 may receive the shader for warping from the memory 440.

In operation S22, the GPU 410 may perform general rendering, based on a command received from the host and graphic data. The host may include special indicator information in correspondence with a frame that is to be finally output to a screen, and may transmit the frame including the indicator information to the GPU 410. The GPU 410 may determine a frame that is to be warped, by checking the indicator information included in the frame. In operation S23, the GPU 410 may store a frame image having undergone general rendering in the memory 440.

According to the above-described example embodiments, the GPU 410 may periodically receive sensing information (e.g., head motion and/or head position information), in operation S24. According to an example embodiment, when the rendering system 400 is initially set, a location where the sensing information Info_sen from the sensor 420 is stored may be set. For example, the sensing information Info_sen may be stored in the register 411 of the rendering system 400. The sensing information Info_sen may be periodically updated to the register 411, and the sensing information Info_sen stored in the register 411 may be periodically provided to the command processor 414.

For example, the sensing information Info_sen from the sensor 420 may be stored in the storage space of the memory 440, and the sensing information Info_sen may be periodically updated to the memory 440. Address information of the memory 440 that stores the sensing information Info_sen may be set in the register 411, and the GPU 410 may periodically read the sensing information Info_sen stored in the memory 440 by using the address information stored in the register 411 and provide the periodically read-out sensing information Info_sen to the command processor 414. As another example, the sensing information Info_sen from the sensor 420 may be stored in the sensor 420 and may be periodically provided to the GPU 410.

In operation S25, the timer 430 may periodically provide the timing information Info_T to the GPU 410 according to state settings of the rendering system 400. According to an example embodiment, when the GPU 410 includes the internal timer 412, timing information Info_T from the internal timer 412 may be provided to the interrupt controller 413.

The GPU 410 may process externally provided signals according to a general interrupt handling method or another method corresponding thereto. If the externally provided signal is a warping-related signal, such as the sensing information Info_sen and the timing information Info_T, warping may be performed as follows.

In operation S26, the GPU 410 may receive, from the memory 440, frame data that is to be used during warping, for example, rendered frame data, and may receive the sensing information Info_sen stored in an initially-set address of the memory 440. Although the sensing information Info_sen is stored in the memory 440 in FIG. 8, the sensing information Info_sen may be read from the register 411 of the GPU 410 as described above, or the sensing information Info_sen stored in the sensor 420 may be provided to the command processor 414.

The command processor 414 may generate an internal command by using warping-related information, such as the previously received shader for warping, the rendered frame data, and the sensing information Info_sen. The shader processor 415 may perform a graphics operation for warping according to the generated internal command. According to an example embodiment, the generated internal command may be immediately used for command scheduling, or may be used for command scheduling after being stored in the memory 440.

The GPU 410 may interrupt rendering having already been performed with respect to all or some resources according to the preemption method or the like as described above in order to perform warping. The rendered frame data may be warped based on an interpolation or transformation operation using the sensing information Info_sen, and a warped image obtained by reflecting a motion of the user in the image displayed to the user may be generated as a result of the warping. In operation S28, the warped image may be stored in the memory 440.

In operation S29, when the warping has been completed, the GPU 410 may provide the host driver 450 with information representing the completion of the warping. The information representing the completion of the warping may be distinguished from information representing that general rendering has been completed, and the host may control outputting of the warped image, based on the information representing the completion of the warping.

Figure 9:
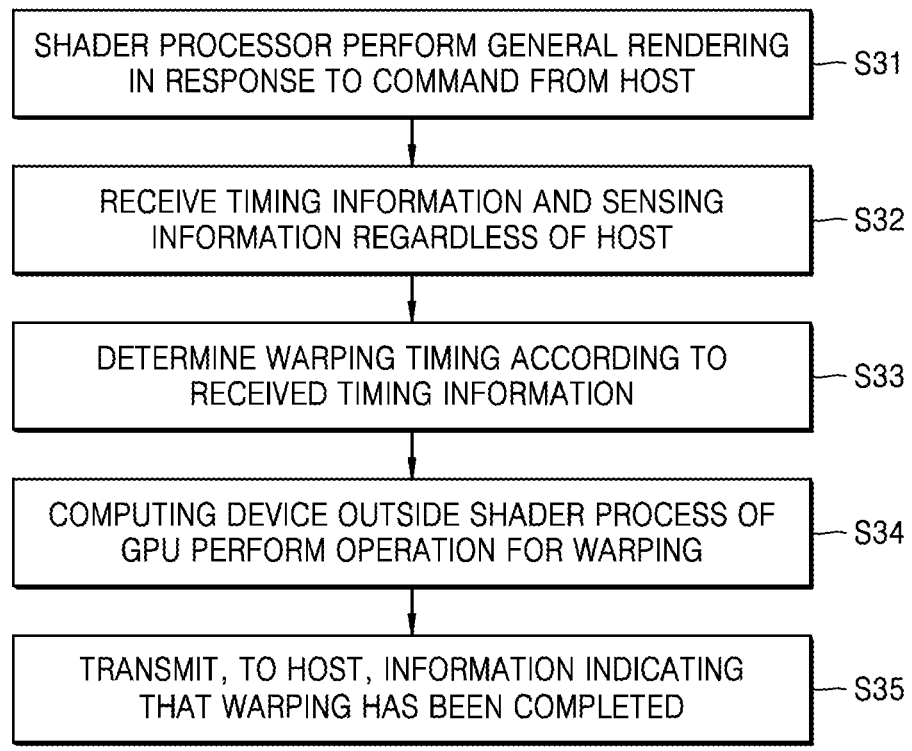
FIGS. 9 and 10 are flowcharts of methods of operating a rendering system, according to example embodiments.
Figure 10:
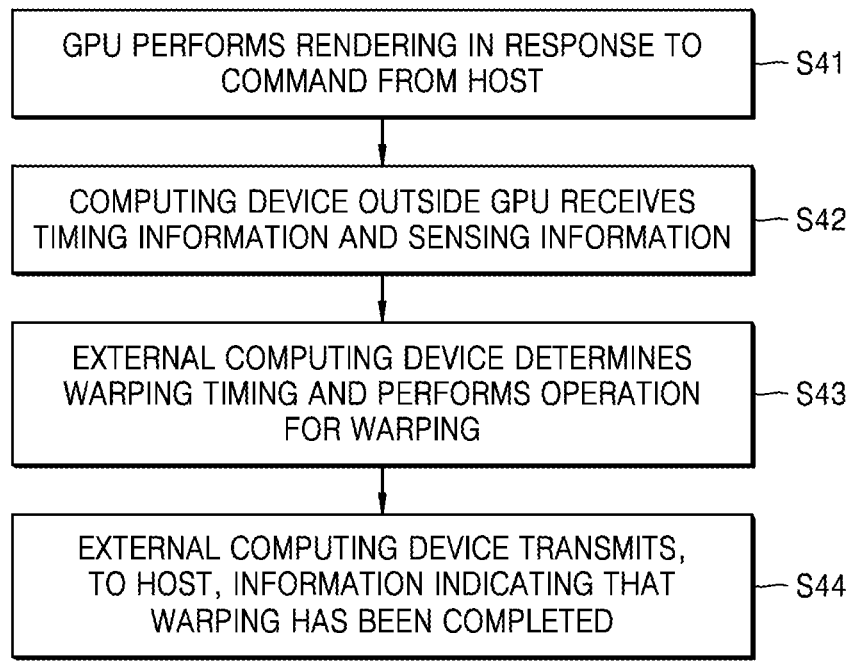

FIGS. 9 and 10 are flowcharts of methods of operating a rendering system, according to example embodiments. FIGS. 9 and 10 illustrate an example in which a graphic operation for warping is performed outside a shader processor.

Referring to FIG. 9, in operation S31, the shader processor may perform general rendering in response to a command from a host. In operation S32, a graphics processor (GPU) may receive timing information and sensing information associated with warping regardless of the host. In operation S33, the graphics processor (GPU) may determine a warping timing according to the received timing information.

The graphics processor (GPU) may further include a computing device that performs a certain operation, in addition to the shader processor for performing general rendering, and the computing device may perform an operation irrelevant to rendering. In this case, when the warping timing has been reached, the graphics processor (GPU) may control an operation of the computing device via an internal command, and the computing device may perform an operation for warping by using already-rendered frame data and the sensing information, in operation S34. When the computing device has completed warping, the graphics processor may transmit, to the host, information indicating that warping has been completed, in operation S35.

However, referring to FIG. 10, in operation S41, the graphics processor (GPU) may perform general rendering in response to the command from the host. The rendering system includes a computing device capable of performing a preset operation. In operation S42, the computing device may receive the timing information and the sensing information according to the above-described embodiment. According to an example embodiment, an external computing device may receive the timing information and the sensing information regardless of the host. According to an example embodiment, the external computing device may receive the timing information and the sensing information via the host.

In operation S43, the external computing device may determine a warping timing, based on the timing information, and may perform an operation for warping by using rendered frame data and the sensing information. In operation S44, the external computing device may transmit, to the host, information indicating that warping has been completed.

According to the example embodiments of FIGS. 9 and 10, because warping is performed by a computing device independent from hardware that performs general rendering within a graphics processor, rendering and warping may be simultaneously performed. In other words, warping may be stably performed, and a rendering speed may be increased due to a reduction in the number of times rendering is interrupted within the graphics processor.

Figure 11:
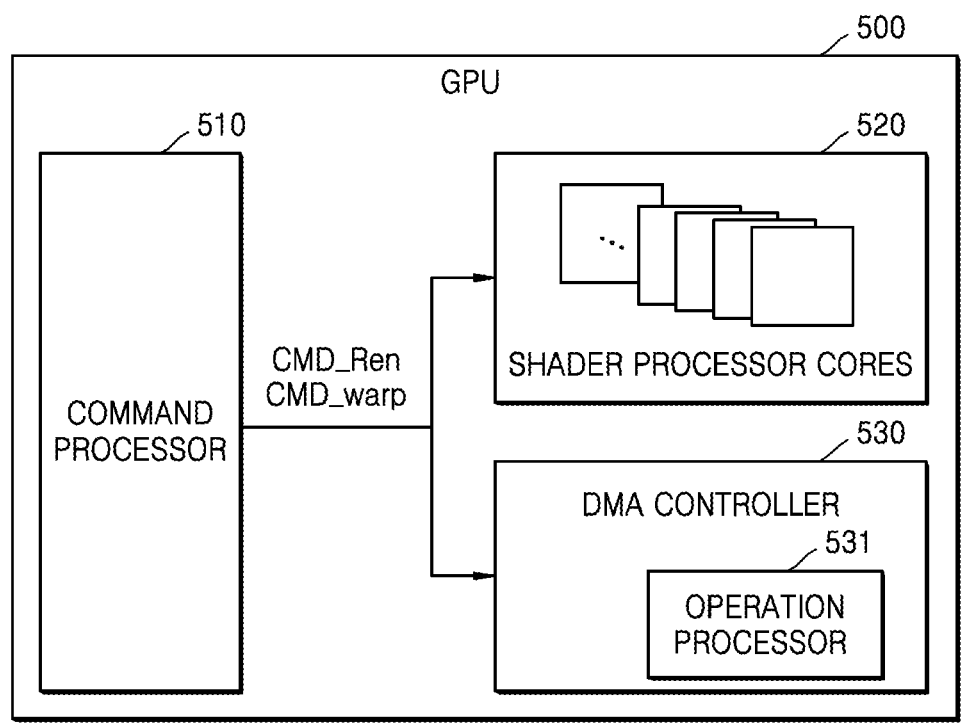
FIG. 11 is a block diagram of an embodiment of a graphics processor that performs the operating methods according to the above-described example embodiment of FIG. 9.

FIG. 11 is a block diagram of an embodiment of a graphics processor that performs the operating methods according to the above-described example embodiment of FIG. 9.

Referring to FIG. 11, a GPU 500 as a graphics processor may include a command processor 510, a shader processor 520, and a DMA controller (DMAC) 530. The DMAC 530 may control an external memory to write and read data to and from the external memory, and may include an operation processor 531 that performs a graphics operation associated with warping. The operation processor 531 may include a calculation function necessary for warping in the form of fixed or programmable hardware.

Warping may be performed via a simple operation, such as interpolation and/or transformation, by using already rendered frame data, and the GPU 500 may perform warping by using the operation processor 531 of the DMAC 530. According to an example embodiment, frame data to be warped and warped frame data may be transmitted between the DMAC 530 and the external memory. At least some of various pieces of information associated with warping may also be transmitted between the DMAC 530 and the external memory. For example, when sensing information is stored in a memory, the sensing information may be transmitted between the DMAC 530 and the memory. A program that has described a warping operation method for a warping operation performed in the DMAC 530 may be stored in the DMAC 530 or the memory, and program information associated with the warping operation may be transmitted between the DMAC 530 and the memory.

According to an operation example, the command processor 510 may perform an operation of processing a command from a host according to the above-described example embodiments, and may generate a warping command CMD_warp for performing internal warping. For example, the command processor 510 may process the command from the host and thus provide an internal command CMD_Ren for general rendering to the shader processor 520.

The command processor 510 may generate the warping command CMD_warp by using pieces of information associated with warping according to the above-described example embodiment and may provide the warping command CMD_warp to the DMAC 530. For example, the command processor 510 may periodically generate the warping command CMD_warp, based on the timing information. When the sensing information is provided from an external sensor to the GPU 500, sensing information associated with head motion and/or head position information of a user may be provided to the DMAC 530 under the control of the command processor 510. For example, when the sensing information is stored in a register included in the GPU 500, the sensing information is read from the register and provided to the DMAC 530, under the control of the command processor 510.

According to an example embodiment, general rendering by the shader processor 520 and warping by the DMAC 530 may be performed in parallel. For example, even when a timing at which warping is to be performed has been reached, an interrupt controller included in the GPU 500 may not generate an interrupt for interrupting general shading.

Figure 12:
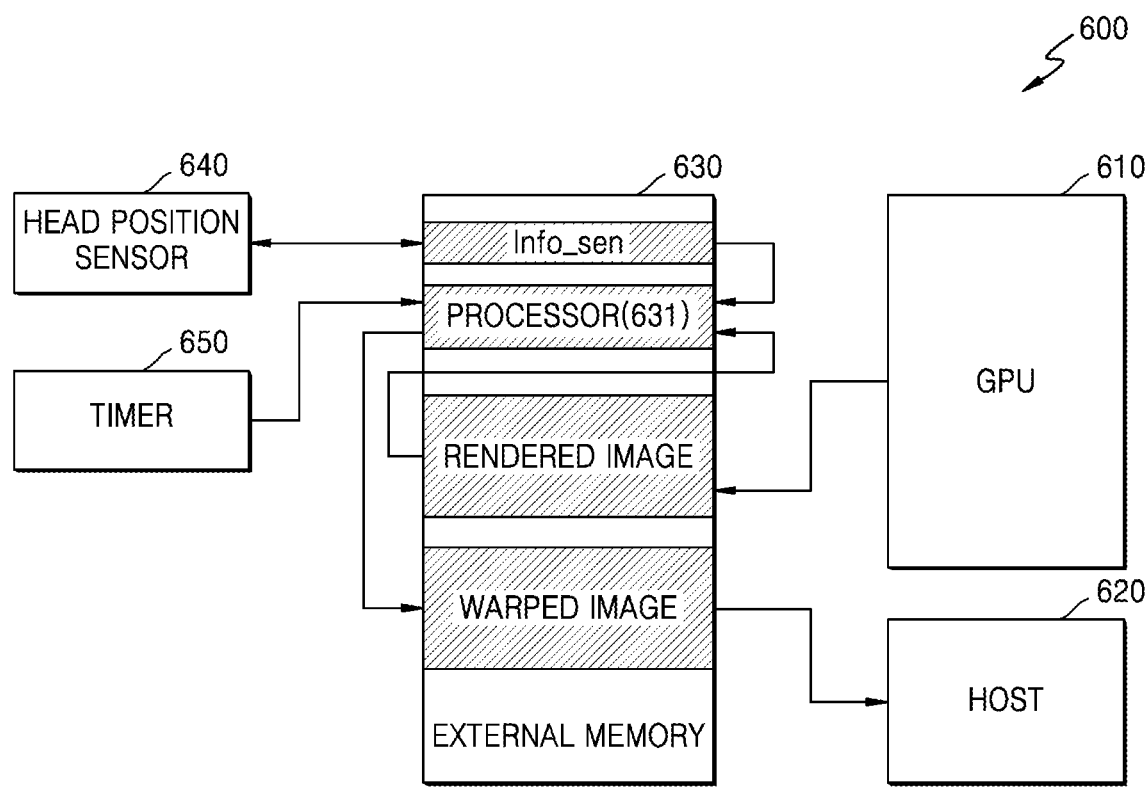
FIG. 12 is a block diagram of an embodiment of a rendering system that performs the operating methods according to the above-described example embodiment of FIG. 10.

FIG. 12 is a block diagram of an example embodiment of a rendering system 600 that performs the operating methods according to the above-described example embodiment of FIG. 10. FIG. 12 illustrates an example in which warping is performed in external memory.

The rendering system 600 may include a GPU 610 as a graphics processor, a host 620, an external memory 630, a sensor 640, and a timer 650. As in the above-described example embodiment, the sensor 640 may sense a head motion and/or a head position of a user to generate sensing information, and the timer 650 may be implemented as an internal timer included in the GPU 610.

According to an example embodiment, the external memory 630 may include a processor 631 that performs a graphic operation for warping, together with a storage space for storing various pieces of information and data. As the external memory 630 includes an internal processing function, the external memory 630 may be referred to as a processor in memory (PIM). FIG. 12 illustrates an example in which the storage space of the external memory 630 includes a space for storing a rendered frame image, a space for storing a warped image, and a space for storing various types of information. According to an example embodiment, sensing information Info_sen from the sensor 640 may be periodically stored in the external memory 630.

The GPU 610 may perform general rendering in response to a command from the host 620 and may store rendered frame data in the external memory 630. Timing information from the timer 650 may be provided directly to the external memory 630, rather than via the GPU 610, and the processor 631 may periodically and directly perform a graphic operation for warping, based on the timing information. For example, a rendered frame image and the sensing information Info_sen may be provided to the processor 631. The processor 631 may perform a warping process in which the sensing information Info_sen has been reflected, periodically according to the timing information, and may provide the host 620 with information representing that warping has been completed. Similar to the above-described example embodiment, program information that has described a warping operation method may be stored in the external memory 630, and the above-described warping process may be performed using the program information.

According to the example embodiment of FIG. 12, warping may be performed outside the GPU 610, and accordingly, various types of information associated with the warping may be directly provided to the external memory 630. Although the timing information and the sensing information are all provided to the external memory 630 in FIG. 12, embodiments are not limited thereto. For example, the timing information may be provided to the GPU 610, and the GPU 610 may periodically provide a command for performing a graphic operation for warping to the external memory 630. According to the example embodiment of FIG. 12, general rendering by the GPU 610 and warping by the external memory 630 may be performed in parallel.

Figure 13:
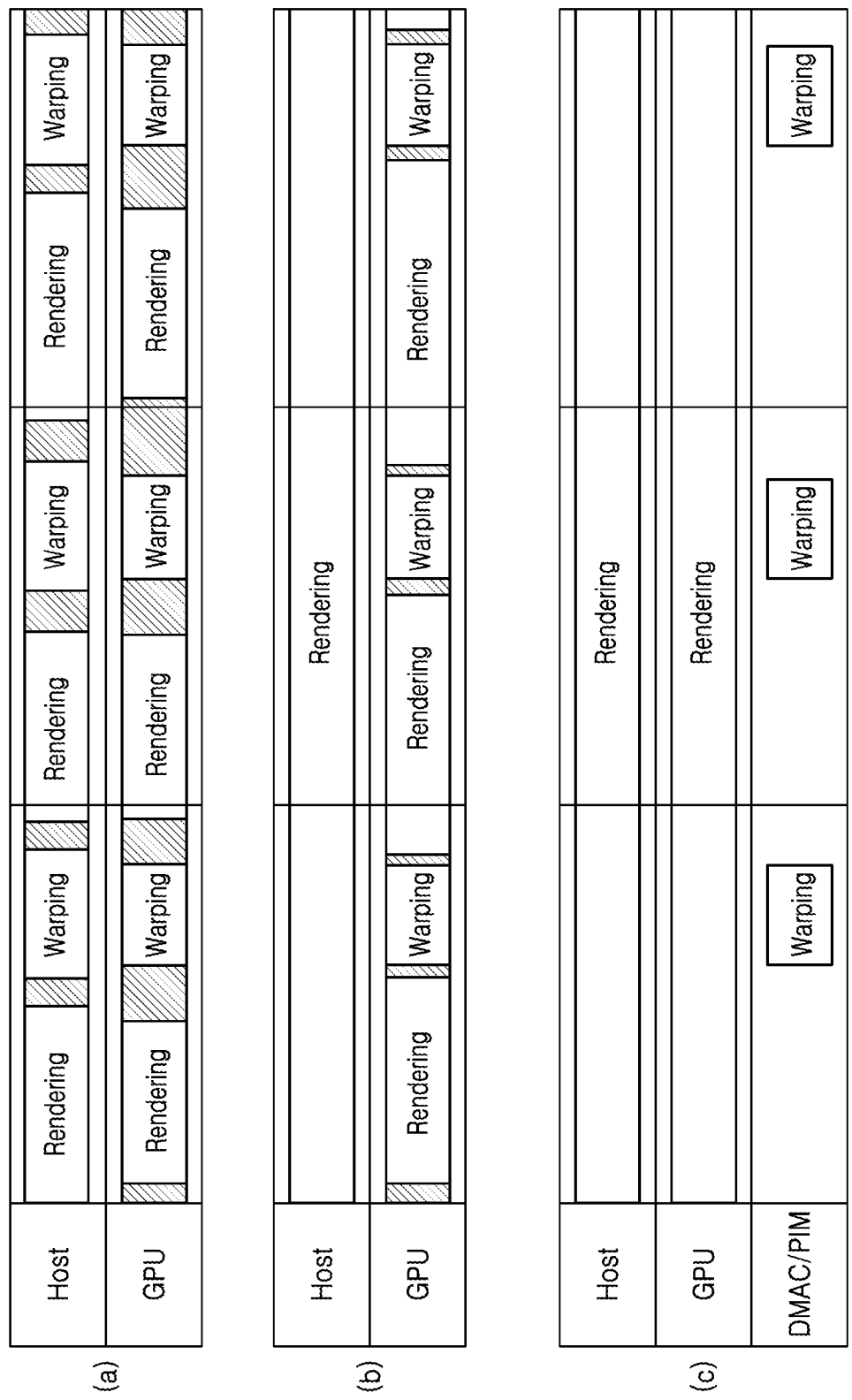
FIG. 13 illustrates an example of operational characteristics during warping under the control of a host, warping by a GPU, and warping by an operation processor.

FIG. 13 illustrates an example of operational characteristics during warping under the control of a host, warping by a GPU, and warping by an operation processor. Diagram (a), (b), and (c) of FIG. 13 illustrate rendering and warping from the viewpoint of the GPU.

Referring to diagram (a) of FIG. 13, when warping is performed by a context switch by the host, the host periodically performs a switch between general rendering and warping via a context switch. The GPU may perform general rendering and warping by reflecting a delay time due to the context switch.

However, referring to diagram (b) of FIG. 13, the host may provide a command for rendering to the GPU without a switch to warping. The GPU may alternately perform rendering and warping. In this case, a delay time generated during a switch between rendering and warping may be removed or reduced.

However, referring to diagram (c) of FIG. 13, when an operation processor included in a memory controller or a processor included in a memory performs warping according to the above-described example embodiment, the GPU may continuously perform rendering without a switch to warping, and the operation processor or the processor may perform warping independently from the rendering, namely, perform the warping and the rendering in parallel. Accordingly, a speed of rendering by the GPU may increase, and the operation processor or the processor may stably perform warping.

Figure 14:
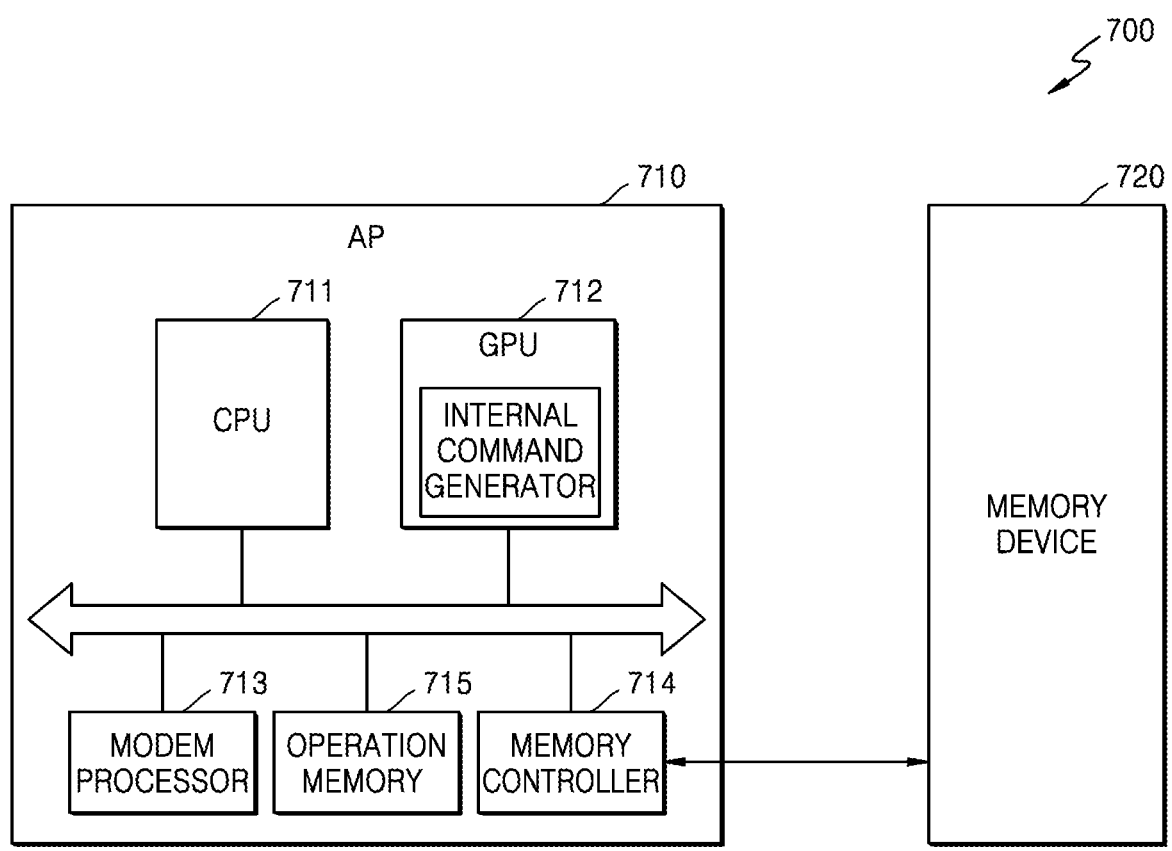
FIG. 14 is a block diagram of a mobile device including a memory device, according to an example embodiment.

FIG. 14 is a block diagram of a mobile device 700 including a memory device 720, according to an example embodiment.

The mobile device 700 may correspond to a rendering system, and may include an application processor (AP) 710 and the memory device 720. The AP 710 may be implemented by using a system on chip (SoC). The SoC may include a system bus to which a protocol having a certain bus standard has been applied, and may include various types of Intellectual Property (IP) devices that are connected to the system bus. FIG. 14 illustrates the AP 710 including a CPU 711, a graphics processor (GPU) 712, a modem processor 713, a memory control unit 714, and an operation memory 715, as the IP devices. As the AP 710 performs a modem communication function, the AP 710 may be referred to as ModAP.

An Advanced Microcontroller Bus Architecture (AMBA) protocol by Advanced RISC Machine (ARM) may be applied as a standard of the system bus. Examples of buses using the AMBA protocol may include an Advanced High-Performance Bus (AHB), an Advanced Peripheral Bus (APB), an Advanced eXtensible Interface (AXI), AXI4, and AXI Coherency Extensions (ACE). Besides them, other types of protocols, such as uNetwork by SONICs Inc., CoreConnect by IBM, and an Open Core Protocol by OCP-IP, are applicable.

The graphics processor 712 may perform the warping processes described above in the above-described embodiments. Accordingly, the graphics processor 712 may determine a warping timing without interventions of an OS, generate an internal command, and perform an operation for warping according to the generated internal command. For example, without requiring the CPU 711 to execute a program stored in the operation memory 715 in order to perform a context switch associated with warping, the graphics processor 712 may receive sensing information and may perform warping by using the sensing information. The graphics processor 712 may transmit a warped image to the memory device 720 and may provide a host with information indicating that warping has been completed.

While the present disclosure has been shown and described with reference to example embodiments thereof, it will be understood that various changes in form and details may be made therein without departing from the spirit and scope of the following claims.

What is claimed is:

1. A graphics processor comprising:
   an internal command generator configured to:
      receive, without an intervention from a host, timing information having a certain period, and
      generate, based on the timing information, a warping command for periodically performing warping; and
   a graphics computing device configured to, by using at least one piece of hardware:
      in response to the warping command from the internal command generator, periodically perform the warping according to the certain period, without a context switch from rendering to the warping by the host, by using sensing information provided from an external source and frame data that have already been rendered,
   wherein the warping is performed without requiring the host to execute a program to perform the context switch from the rendering to the warping.

2. The graphics processor of claim 1, further comprising an interrupt controller configured to control an interrupt operation such that the graphics computing device interrupts a rendering process that is currently being performed and performs the warping, based on the timing information.

3. The graphics processor of claim 1, wherein the sensing information and the timing information are directly provided to the graphics computing device, rather than via the host.

4. The graphics processor of claim 3, wherein the sensing information comprises head position information of a user generated by a sensor included in a virtual reality (VR) device coupled with the graphics processor.

5. The graphics processor of claim 1, further comprising an internal timer configured to generate the timing information that represents a timing of when the warping is to be performed,
   wherein the internal command generator is further configured to receive the timing information from the internal timer.

6. The graphics processor of claim 1, further comprising a register configured to store the sensing information, wherein the sensing information is updated periodically in the register,
   wherein the sensing information is read from the register and provided to the graphics computing device.

7. The graphics processor of claim 1, wherein the graphics computing device comprises a plurality of processing cores including a first processing core and a second processing core,
   wherein general rendering according to a command from the host is performed by the first processing core, and the warping according to the warping command is performed by the second processing core, and
   wherein the general rendering by the first processing core and the warping by the second processing core are performed in parallel.

8. The graphics processor of claim 1, wherein the graphics computing device is further configured to perform the warping by further using a shader program that is provided by the host when the graphics processor initially operates.

9. The graphics processor of claim 1, wherein the graphics computing device comprises a memory controller for controlling an external memory, and the memory controller comprises an operation processor, and
   wherein the warping is performed by the operation processor within the memory controller.

10. The graphics processor of claim 1, wherein the graphics computing device is further configured to:
    receive, from the host, indicator information indicating whether a frame to be rendered is to be warped, and
    notifying the host that the warping has been completed.

11. A rendering system comprising:
    a timer configured to generate, without an intervention from a host, cycle information representing a warping timing according to a certain period;
    a graphics processor configured to perform rendering in response to a command from ft the host to generate rendered frame data; and
    a memory comprising a memory region that stores the rendered frame data, and a processor configured to, based on the cycle information, periodically perform warping according to the certain period, without a context switch from rendering to the warping by the host, by using the rendered frame data and sensing information provided from an external source, and store a warped image in the memory region,
    wherein the warping is performed without requiring the host to execute a program to perform the context switch from the rendering to the warping.

12. The rendering system of claim 11, wherein the cycle information and the sensing information are directly provided to the memory, rather than via the host included in the rendering system.

13. The rendering system of claim 11, wherein the memory further comprises an information storage region that stores at least one piece of information associated with the warping, and
    wherein the sensing information provided from the external source is periodically updated in the information storage region, and the sensing information read from the information storage region is provided to the processor.

14. The rendering system of claim 11, wherein the rendering by the graphics processor and the warping by the processor are performed in parallel.

15. The rendering system of claim 11, wherein the graphics processor is further configured to provide, to the memory, an indicator indicating a frame that is to be warped from among rendered frames, and
    wherein the memory is further configured to perform the warping by using the rendered frame data that is indicated by the indicator, and notifying the host that the warping has been completed.

16. A method of operating a graphics processor, the method comprising:
    generating rendered frame data in response to a command from a host;
    determining a warping timing according to a certain period, based on timing information received without an intervention of the host;
    periodically performing warping according to the certain period, without a context switch from rendering to the warping by the host, based on the rendered frame data and sensing information received independent of the host; and
    notifying the host that the warping has been completed, wherein the warping is performed without requiring the host to execute a program to perform the context switch from the rendering to the warping.

17. The method of claim 16, further comprising receiving, from the host, indicator information indicating a frame that is to be warped, wherein the performing the warping comprises warping frame data indicated by the indicator information from among at least one frame data stored in an external memory.

18. The method of claim 16, further comprising receiving, from the host, a shader program for the warping, wherein the warping is performed by using the shader program.

19. The method of claim 16, further comprising performing an interrupt control to interrupt rendering currently being performed and perform the warping, based on the timing information.

20. The method of claim 16, wherein the graphics processor comprises at least one processing core and a memory controller for communicating with an external memory, wherein the rendering is performed by the at least one processing core, and the warping is performed by an operation processor included in the memory controller, and the rendering and the warping are performed in parallel.

* * * * *